United States Patent [19]
Koshimizu

[11] Patent Number: 5,834,652
[45] Date of Patent: Nov. 10, 1998

[54] PRESSURE SENSING DEVICE WITH ELASTIC SEALING MEMBER AND METHOD OF EASY INSTALLATION

[75] Inventor: Akira Koshimizu, Hyogo, Japan

[73] Assignee: Mitsubishi Denki Kabushiki Kaisha, Tokyo, Japan

[21] Appl. No.: 976,722

[22] Filed: Nov. 24, 1997

Related U.S. Application Data

[63] Continuation of Ser. No. 699,063, Aug. 15, 1996, abandoned.

[51] Int. Cl.[6] .................................................. G01L 7/00
[52] U.S. Cl. ................................................ 73/756; 73/706
[58] Field of Search .............................. 73/706, 715, 720, 73/721, 726, 727, 756; 220/691; 227/178

[56] References Cited

U.S. PATENT DOCUMENTS

| | | |
|---|---|---|
| 4,852,466 | 8/1989 | Freeman et al. .......................... 73/756 |
| 5,292,155 | 3/1994 | Bell et al. ................................. 73/756 |
| 5,317,924 | 6/1994 | Maack ....................................... 73/756 |

FOREIGN PATENT DOCUMENTS 4-325316  11/1992  Japan ............................. B60K 15/03

*Primary Examiner*—William L. Oen
*Attorney, Agent, or Firm*—Sughrue, Mion, Zinn, Macpeak & Seas, PLLC

[57] ABSTRACT

In a pressure sensing device, a sensor housing container is provided with a flange-like mounting portion to be attached to a medium container made of a thin plate by a bolt. The flange-like mounting portion has a mounting plane of said sensor housing container and is formed to have a great thickness enough to provide high rigidity. At the mounting plane, there are provided an opening through which a nipple of said pressure sensor protrudes from the sensor housing container and a concave plane on its periphery. A sealing member of elastic material is caused to intervene between the flange-like mounting portion and the medium container. The sealing member is integrally molded in a first space formed between an inner wall of the opening and an outer wall of the nipple and a second space communicating with the first space and formed by the concave plane when the sensor housing container is mounted on the medium container. Thus, a pressure sensing device can be obtained which does not require redundant components for reinforcement to be added to the medium container of a thin plate for housing a measuring pressure medium.

8 Claims, 3 Drawing Sheets

PRESSURE SENSING DEVICE WITH ELASTIC SEALING MEMBER AND METHOD OF EASY INSTALLATION

This is a Continuation of application Ser. No. 08/699,063, filed Aug. 15, 1996, abandoned.

BACKGROUND OF THE INVENTION

The present invention relates to a pressure sensing device directly mounted on a container of a thin plate (hereinafter referred to a "thin plate container" or "medium container") such as a fuel tank for a vehicle to measure the internal pressure of the tank.

FIG. 6 is a sectional view showing a mounting status of the conventional pressure sensing device proposed in JP-A-4-325316. In FIG. 6, reference numeral 1 denotes a part of a thin plate medium container such as an fuel tank for a motor vehicle; 2, a mounting member having a screw hole 3 integrated to the medium container 1 by welding or the like; 4, a sensor housing container; 5, a pressure sensor incorporating a pressure sensing element of e.g. semiconductor; 6, a plate housed together with the pressure sensor 5 within the sensor housing container 4; 7, an amplifying circuit, mounted on the plate 6, for amplifying an output signal from the pressure sensor 3; 8, a cylindrical nipple for guiding pressure to be measured to a pressure sensing element of the pressure sensor 5; 9, a sealing member provided between the inner wall of the sensor housing container 4 and the outer wall of the nipple 8; and 10, a sealing member provided between the sensor housing container 4 and the mounting member 2.

When the internal pressure of a medium container is measured by a pressure sensing device mounted to the container, it is necessary to assure air-tightness of a mounting portion of the pressure sensing device to prevent the measuring pressure from varying owing to leakage of measuring medium and fire from occurring owing to leakage of evaporated gasoline. For this purpose, conventionally, the pressure sensing device is installed in such a manner as shown in FIG. 6 that the mounting member 2 having high rigidity is integrated to the medium container 1 which is likely to make distortion, the sensor housing container 4 is attached into the screw hole 3 of the mounting member 2, and the sealing member 10 such as an O-ring is provided between the sensor housing container 4 and the mounting member 2.

Further, in order to protect the amplifying circuit 7 provided in the sensor housing container 4 from a gasoline vapor environment, the sealing member 9 such as an O-ring is provided between the inner wall of the sensor housing container 4 and the outer wall of the nipple 8 of the pressure sensor 5.

Both sealing members 9 and 10 protect the interior of the medium container from an outside air so that the pressure sensing element can be communicated with only the interior of the medium container.

The above conventional method of mounting a pressure sensing device can maintain the air-tightness of a mounting portion of the pressure sensing device. However, the step of integrating the mounting member 2 having rigidity to the medium container 1 with air-tightness causes poor productivity, thereby increasing the number of components and also causes low reliability for the air-tightness. The above method requires the sealing member 9 when the pressure sensor 5 is integrated into the sensor housing container 4, and requires the sealing member 10 also when the sensor housing container 4 is mounted on the mounting member 2. This also suffers from the problems of an increase in the number of components and number of man-hours as well as reduction of reliability due to erroneous mounting.

SUMMARY OF THE INVENTION

The present invention has been accomplished in order to solve the above problems.

An object of the present invention is to provide a pressure sensing device which does not require redundant components for reinforcement to be added to a thin plate medium container for housing a measuring pressure medium.

Another object of the present invention is to provide a method of mounting such a pressure sensing device.

In accordance with the present invention, there is provided a pressure sensing device comprising: a pressure sensor incorporating a pressure sensing element and a cylindrical nipple for introducing pressure to be measured into the pressure sensing element; a sensor housing container for housing the pressure sensor and having a flange-like mounting portion including a mounting plane of the sensor housing container and being formed to have a great thickness enough to provide rigidity; an opening through which the nipple of said pressure sensor protrudes from said sensor housing container and a concave plane on its periphery, the opening and the concave plane being located on the mounting plane; and a medium container containing a medium of pressure to be measured and having a pressure sensing inlet for sensing the pressure through the nipple; and a sealing member of elastic material integrally molded in a first space formed between an inner wall of the opening and an outer wall of said nipple and a second space communicating with said first space and formed by the concave plane when the sensor housing container is mounted on said medium container.

The sealing member is composed of a plane area fit in the second space and a cylindrical portion formed in a direction perpendicular to the plane portion and press-fit in the first space, the plane portion has circular protrusions, on its both sides, in pressure contact between the concave plane and the medium container, and the cylindrical portion has ribs, on its inside, in pressure-contact with the outer wall of said nipple and on its outside in pressure-contact with the inner wall of the opening.

The sealing member has a tapered protrusion engaged with the pressure detecting inlet of the medium container or with a cylindrical protrusion provided at the pressure sensing inlet.

The method of mounting the pressure sensing device comprises: press-fitting the cylindrical area of the sealing member between the inner wall of the opening and the outer wall of the nipple to integrate the sealing member to the sensor housing container; and mounting the sensor container on the medium container.

In accordance with the pressure sensing device and the method of mounting such a device, since the flange-like mounting portion of the pressure sensing device has high rigidity, by attaching the pressure sensing device to a medium container at the flange-like mounting portion, the distortion of the medium container made of a thin film can be corrected and the sealing effect of the sealing member intervening between the pressure sensing device and the medium container can be enhanced. Unlike the prior art, a member for reinforcement for the medium container unnecessary is not required.

Since the cylindrical portion of a sealing member having an integral structure is tightly inserted between the opening of the pressure sensing device and a nipple so that the pressure sensing device and the sealing member can be maintained integrally, the pressure sensing device can be installed with a high reliability.

Since the sealing member integrated to the pressure sensing device can be engaged with a pressure sensing inlet of the medium container, the pressure sensing device can positioned or provisionally fixed, thus making a mounting operation easy.

The above and other objects and features of the present invention will be more apparent from the following description taken in conjunction with the attached drawings.

DESCRIPTION OF THE PREFERRED EMBODIMENTS

Embodiment 1

Figure 1:
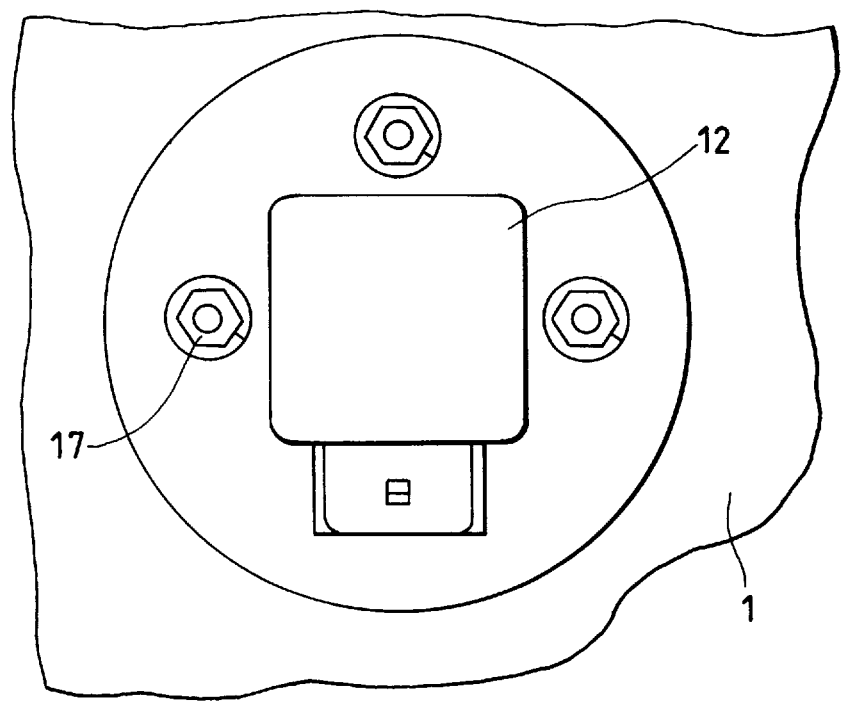
FIG. 1 is a plan view showing the first embodiment of the present invention.
Figure 2:
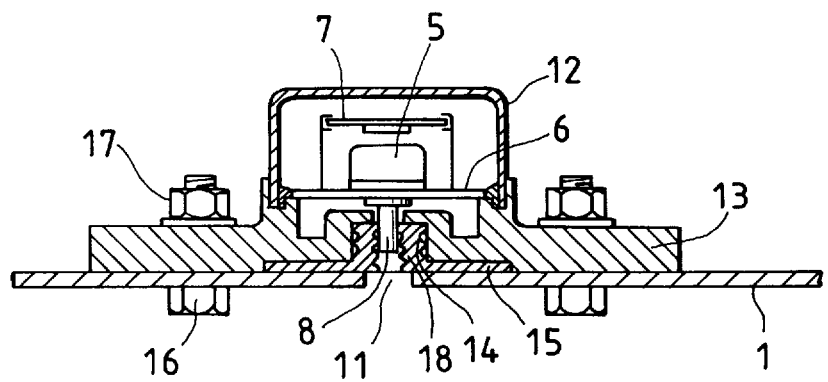
FIG. 2 is a sectional view showing the first embodiment of the present invention.
Figure 3:
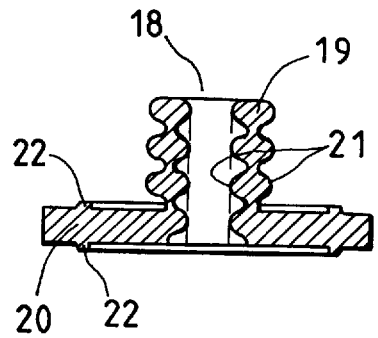
FIG. 3 is a sectional view of the sealing member used in the first embodiment.

FIG. 1 is a plan view showing the first embodiment of the present invention. FIG. 2 is a sectional view showing the first embodiment of the present invention. FIG. 3 is a sectional view showing the details of a sealing member. In these figures, like reference numerals refer to like parts in the conventional pressure sensing device. In FIGS. 1 to 3, reference numeral 1 denotes a medium container such as a vehicle fuel tank; 11, a pressure sensing inlet formed in the medium container so as to derive the internal pressure thereof; and 12, a sensor housing container. Like the conventional sensor housing container, the sensor housing container 12 houses a pressure sensor 5, a base plate 6 and an amplifying circuit 7, and also includes a flange-like mounting portion 13 for mounting the medium container 1. The flange-like mounting portion 13 is formed to have a great thickness to enhance its rigidity. The flange-like mounting portion has an opening 14 and a concave portion 15 on the periphery. At the center of the opening 13, a nipple 8 provided in the pressure sensor 5 protrudes from the inside of the sensor housing container 12. A bolt 16 and a nut 17 serve to attach the sensor housing container 12 to the medium container 1 at the flange-like mounting portion 13.

Reference numeral 18 denotes a sealing member made of an elastic material. As seen from FIG. 3 showing its details, the sealing member 18 is composed of a cylindrical portion 19 and a plane portion 20 which are integrated to each other. The cylindrical portion 19 is press-fitted between the inner wall 14 formed on the mounting face of the flange-like mounting portion 13 and the outer wall of the nipple 8. The plane portion 20 is sandwiched between the concave plane 15 of the above mounting plane and the medium container 1 to communicate the inside of the medium container 1 with only that of the pressure sensor 5, thereby maintaining air-tightness of the inside of the sensor housing container from outside air. As shown in FIG. 3, the sealing member 18 is provided with circular ribs 21 on the inner and outer peripheries of the cylindrical portion 19, and the plane portion 20 is also provided with circular ribs 22 on both walls, thereby giving both air-tightness and mounting quality.

In the pressure-sensing device thus configured, the integral sealing member 18 keeps air-tightness of the mounting plane and the inside of the sensor housing container. For this reason, contrary to the conventional pressure sensing device, it is not required that the sealing member is formed at two points. Since the flange-like mounting portion 13 of the pressure sensing device has a great thickness to enhance its rigidity, the pressure sensing device has only to be mounted in the medium container 1 to correct the distortion of the thin plate medium container 1. Therefore, without using the member for enhancing the rigidity of the medium container, the air-tightness can be attained, thereby reducing the number of components. Further, since the sealing member 18 whose cylindrical portion 19 is press-fit between the opening 14 and the nipple 8 can be integrated to the pressure sensing device, the mounting state of the pressure sensing device for the medium container 1 can be improved.

Embodiment 2

Figure 4:
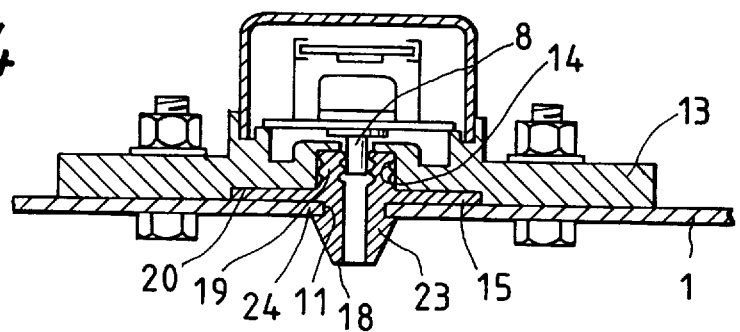
FIG. 4 is a sectional view of the second embodiment of the present invention.

FIG. 4 is a sectional view showing the second embodiment of the present invention. In this embodiment, the sealing member 18 is composed of a cylindrical portion 19 press-fit between the inner wall of the opening 14 provided on the mounting plane of the flange-like mounting portion and the outer wall of the above nipple 18; a plane portion 20 sandwiched between the concave plane 15 of the mounting plane and the medium container 1; a protrusion 23 having a tapered outer shape with an acute tip; a circular groove 24 engaged with the pressure sensing inlet of said medium container 1 between the protrusion 23 and the plane portion 20. The tapered protrusion 23 serves as a guide for inserting the sealing member 18 into the pressure sensing inlet 11.

The pressure sensing device according to the second embodiment can further improve the mounting performance in addition to the structure and effect of the first embodiment. Specifically, in this embodiment, the sealing member 18 is integrated to the pressure sensing device by means of its cylindrical portion 19, and inserted into the pressure sensing inlet 11 of the medium container 1 using its tapered detecting protrusion 23 as a guide so that its circular groove 24 is engaged with the pressure sensing inlet 11. This permits the pressure sensing device to be provisionally fixed or positioned on the medium container 1. Particularly, even if the plane of the medium container 1 is inclined, the pressure sensing device can be surely fixed in its position so that its mounting quality is improved.

Embodiment 3

Figure 5:
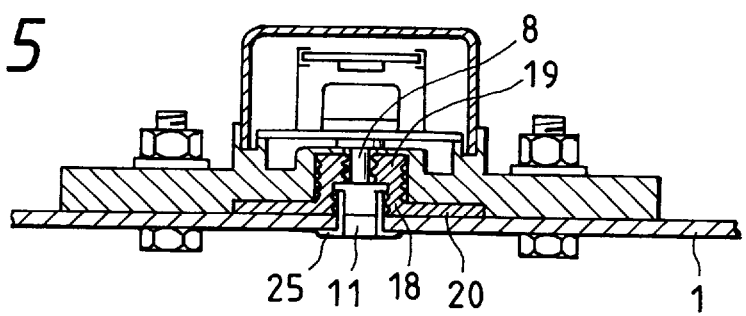
FIG. 5 is a sectional view of the third embodiment of the present invention.
Figure 6:
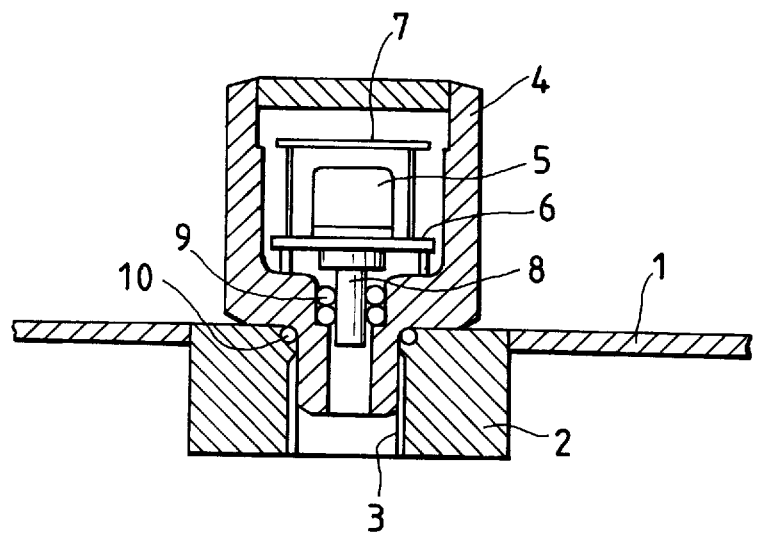
FIG. 6 is a sectional view of the mounting state of a conventional pressure sensing device.

FIG. 5 is a sectional view showing the third embodiment. In this embodiment, the sealing member 18, with the inner diameter of the hole of its cylindrical portion 19 engaged with the nipple 8 being enlarged on the side of the plane portion 20, is engaged with a cylindrical protrusion 25 provided in the pressure sensing inlet 11 of the medium container 1.

In the pressure sensing device according to the third embodiment, although the number of components is increased because of necessity of the cylindrical protrusion 25, the third embodiment can give the same effect as the second embodiment to provide a pressure sensing device with good mounting quality. Since the cylindrical protrusion 25 can be hold its air-tightness through the sealing member, the air-tightness of the mounting portion is not required so that mounting of the pressure sensing device does not require any complicated process.

What is claimed is:

1. A pressure sensing device mounted on an outer wall of a medium container for measuring an internal pressure of said medium container, comprising:

a pressure sensor including a pressure sensing element and a cylindrical nipple for introducing pressure to be measured into the pressure sensing element;

a sensor housing container for housing said pressure sensor;

a flange-like mounting portion including a mounting plane of the sensor housing container and being formed to have a thickness sufficient to provide rigidity, said flange-like mounting portion having an opening through which said nipple of said pressure sensor protrudes from said sensor housing container and a concave plane on its periphery, said opening and said concave plane being located on the mounting plane; and a sealing member made of elastic material including a cylindrical portion and a plane portion, said cylindrical portion being fitted in a first space formed between an inner wall of said opening and an outer wall of said nipple and said plane portion being fitted in a second space communicating with said first space and formed by said concave plane and the outer wall of said medium container when said sensor housing container is mounted on said medium container, wherein said plane portion is perpendicular to said cylindrical portion.

2. A pressure sensing device according to claim 1, wherein said plane portion has circular protrusions, on both sides, in pressure contact between said concave plane and said medium container, and said cylindrical portion has ribs, on its inside, in pressure-contact with the outer wall of said nipple, and, on its outside, in pressure-contact with the inner wall of said opening.

3. A pressure sensing device according to claim 1, further comprising a protrusion formed continuously with said cylindrical portion and having a tapered outer shape with an acute tip, and a circular groove engaged with said pressure sensing inlet between said protrusion and said plane portion.

4. A pressure sensing device according to claim 2, further comprising a protrusion formed continuously with said cylindrical portion and having a tapered outer shape with an acute tip, and a circular groove engaged with said pressure sensing inlet between said protrusion and said plane portion.

5. A pressure sensing device according to claim 1, wherein a cylindrical protrusion is formed in said pressure sensing inlet and is engaged with a hole of said cylindrical area of said sealing member.

6. A pressure sensing device according to claim 2, wherein a cylindrical protrusion is formed in said pressure sensing inlet and is engaged with a hole of said cylindrical area of said sealing member.

7. A method of mounting a pressure sensing device on a medium container, said pressure sensing device comprising a pressure sensor including a pressure sensing element and a cylindrical nipple for introducing pressure to be measured into the pressure sensing element; a sensor housing container for housing said pressure sensor; a flange-like mounting portion including a mounting plane of the sensor housing container and being formed to have a thickness sufficient to provide rigidity, said flange-like portion having an opening through which said nipple of said pressure sensor protrudes from said sensor housing container and a concave plane on its periphery, said opening and said concave plane being located on the mounting plane; and a sealing member made of elastic material including a cylindrical portion and a plane portion, said cylindrical portion being fitted in a first space formed between an inner wall of said opening and an outer wall of said nipple and said plane portion being fitted in a second space communicating with said first space and formed by said concave plane and an outer wall of said medium container when said sensor housing container is mounted on said medium container, said plane portion being perpendicular to said cylindrical portion, comprising the steps of:

press-fitting the cylindrical portion of said sealing member between the inner wall of said opening and the outer wall of said nipple to position said sealing member within the mounting plane of said sensor housing container; and mounting said sensor container on the outer wall of said medium container.

8. A pressure sensing device according to claim 1, wherein the outer wall of said medium container is thin so that the thickness of said mounting portion provides rigidity to prevent the outer wall from distorting against said sensor container.

* * * * *